United States Patent
Yang (10) Patent No.: US 7,340,736 B2
(45) Date of Patent: Mar. 4, 2008

(54) ELECTRONIC DEVICE WITH AN UPDATE AGENT THAT EMPLOYS PREPROCESSING TECHNIQUES FOR UPDATE

(75) Inventor: Xuguang Yang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/635,991

(22) Filed: Aug. 7, 2003

(65) Prior Publication Data

US 2004/0040020 A1 Feb. 26, 2004

Related U.S. Application Data

(60) Provisional application No. 60/405,253, filed on Aug. 22, 2002, provisional application No. 60/415,620, filed on Oct. 2, 2002, provisional application No. 60/441,867, filed on Jan. 22, 2003, provisional application No. 60/447,977, filed on Feb. 18, 2003, provisional application No. 60/461,248, filed on Apr. 8, 2003.

(51) Int. Cl.
*G06F 9/44* (2006.01)
*G06F 9/445* (2006.01)

(52) U.S. Cl. .................. 717/168; 717/170; 717/171

(58) Field of Classification Search ............... 717/168, 717/171

See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Tuan Dam
*Assistant Examiner*—Isaac Tecklu (57) ABSTRACT

Methods of updating an electronic device having an update agent employing preprocessing techniques is disclosed. The methods described permit an electronic device having a non-volatile memory to update a plurality banks in an efficient manner, by preprocessing the original contents of the non-volatile memory. The preprocessing may comprise shifting one or more banks before performing an update, so as to create a moving, unoccupied bank or "bubble" into which the updated version of a bank may be stored. An embodiment of the present invention provides a reduction in the processing of the original memory contents, and extends the life of the non-volatile memory devices used.

31 Claims, 3 Drawing Sheets

Bank Order Specification = (2, N-1, 3, 1, N)

U.S. PATENT DOCUMENTS

| | | | |
|---|---|---|---|
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,040,781 A | 3/2000 | Murray | |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,199,203 B1* | 3/2001 | Saboff | 717/168 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,615,405 B1 | 9/2003 | Goldman et al. | |
| 6,832,373 B2* | 12/2004 | O'Neill | 717/171 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2005/0102660 A1* | 5/2005 | Chen et al. | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

Bank Order Specification = (2, N-1, 3, 1, N)

Fig. 3

ELECTRONIC DEVICE WITH AN UPDATE AGENT THAT EMPLOYS PREPROCESSING TECHNIQUES FOR UPDATE

RELATED APPLICATIONS

This application makes reference to, claims priority to and claims benefit from U.S. Provisional Patent Application Ser. No. 60/461,248, entitled "Electronic Device With An Update Agent That Employs Preprocessing Techniques For Update", filed on Apr. 8, 2003. This application makes reference to U.S. Provisional Patent Application Ser. No. 60/405,253, entitled "Firmware Update Network And Process Employing Preprocessing Techniques", filed on Aug. 22, 2002, U.S. Provisional Patent Application Ser. No. 60/415,620, entitled "System For Generating Efficient And Compact Update Packages", filed on Oct. 2, 2002, U.S. Provisional Patent Application Ser. No. 60/441,867, entitled "Mobile Handset Update Package Generator That Employs Nodes Technique", filed on Jan. 22, 2003, and U.S. Provisional Patent Application Ser. No. 60/447,977, entitled "Update Package Generator Employing Partial Predictive Mapping Techniques for Generating Update Packages For Mobile Handsets", filed on Feb. 18, 2003.

INCORPORATION BY REFERENCE

The complete subject matter of each of the above-referenced U.S. patent applications is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "System and Method for Updating and Distributing Information", publication date May 23, 2002, the complete subject matter of which are hereby incorporated herein by reference, in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as, for example, mobile phones and personal digital assistants (PDA's) contain firmware and application software that are provided by the manufacturers of the electronic devices, by telecommunication carriers, or by third parties. These firmware and application software often contain software errors or "bugs". In addition, software developers may add new features over the life of the software. Therefore, new versions of the firmware and software are periodically released to fix the bugs, to introduce new features, or both.

The process of updating such a device is relatively complex, and there are many potential sources of interruption of the update process. These include exhaustion of the battery operating the device, loss of the communication link used for the update, and interruption by outgoing or incoming calls. If the firmware/software of a mobile handset is updated and the mobile handset becomes inoperative, the user is likely to be disappointed with the service that disseminated the associated firmware/software update. For these reasons, firmware/software updates in mobile handsets need to be fault-tolerant. Unfortunately, these devices are constrained in many ways, and achieving fault-tolerant behavior is not easy, requiring great care in the design and management of related activities.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in a method of updating an electronic device from a first code version to a second code version according to a bank order, the electronic device having a non-volatile memory comprising a reserved area and a plurality of banks containing the first code version. Such a method may comprise moving the contents of the last bank in the bank order to the reserved area of the non-volatile memory. The method may also comprise shifting the contents of each bank in the bank order to the next bank in the bank order beginning with the penultimate bank in the bank order, and proceeding in descending bank order until the contents of the first bank in the bank order has been shifted to the second bank in the bank order. The method may comprise converting the contents of each bank in the bank order from the first code version to the second code version in a fault tolerant manner beginning with the second bank in the bank order and proceeding in ascending bank order until the last bank in the bank order has been converted, each converted bank being stored in the previous bank in the bank order.

The method may further comprise transforming the contents of the reserved area from the first code version to the second code version in a fault tolerant manner, the second code version being stored in the bank that is last in the bank order. At least one of the moving and the shifting may be performed coincident with at least one preprocessing technique. The at least one preprocessing technique may use at least one preprocessing instruction, and may comprise at least one of a bubbles technique, a nodes technique, and a shift region technique. The updating may use only two writes to each non-volatile memory location being updated.

An embodiment of the present invention may also comprise receiving an update package comprising at least one of at least a preprocessing instruction, an update instruction, and a bank order specification, where the receiving may use a public network and the receiving may use a wireless network. At least one of the converting and the transforming may use at least one update instruction, and at least one of the moving and shifting may use an offset of more than one bank.

Additional aspects of the present invention may be found in a method of operating an electronic device, the electronic device having a non-volatile memory comprising a reserved area and a plurality of banks containing a first code version. An embodiment of the present invention may comprise moving the contents of a designated bank to the reserved area of the non-volatile memory, the designated bank thereby becoming an unoccupied bank. In addition, the embodiment may comprise shifting the contents of each of the plurality of banks other than the designated bank from an original bank to an unoccupied bank in a bank by bank fashion, each original bank thereby temporarily becoming an unoccupied bank. An embodiment of the present invention may further comprise converting the contents of each of the plurality of banks other than the designated bank from the first code version to a second code version in a fault tolerant manner beginning with the contents of the last bank shifted and proceeding in reverse order of the shifting. The second code version of each bank may be stored into the original bank from which the first code version of the bank was shifted. An embodiment in accordance with the present invention may also comprise transforming the contents of the reserved area of the non-volatile memory from the first code version to a second code version in a fault tolerant manner, the second code version being stored in the designated bank.

In an embodiment of the present invention, at least one of the moving, shifting, converting, and transforming may be performed according to a specified bank order, and at least one of the moving and shifting may comprise preprocessing the contents of at least one of the plurality of banks. The preprocessing may comprise at least one of rearranging the contents of a bank, updating an address, updating a reference, and updating a branch instruction, and at least one of the converting and transforming may use at least one update instruction. The preprocessing may use at least one of a bubbles technique, a nodes technique, and a shift regions technique, and may use at least one preprocessing instruction.

An embodiment of the present invention may further comprise receiving an update package comprising at least one of a preprocessing instruction, an update instruction, and a bank order specification, where the receiving may use a public network, and the receiving may use a wireless network.

Further aspects of the present invention may be found in a method of updating an electronic device having a non-volatile memory comprising at least a first bank and a second bank, the at least a first bank and a second bank containing a first code version. An embodiment in accordance with the present invention may comprise moving the contents of the second bank to a reserve bank, transferring the contents of the first bank to the second bank, and converting the contents of the second bank to an updated version of the first bank. The method may further comprise storing the converted contents of the second bank into the first bank, transforming the contents of the reserve bank into an updated version of the second bank, and copying the transformed contents of the reserve bank to the second bank.

At least one of the converting and the transforming may use at least one update instruction, and at least one of the moving and the transferring may comprise preprocessing the contents of at least one of the plurality of banks. The preprocessing may comprise at least one of rearranging the contents of a bank, updating an address, updating a reference, and updating a branch instruction. The preprocessing may use at least one of a bubbles technique, a nodes technique, and a shift regions technique, and may use at least one preprocessing instruction.

At least one of the moving, transferring, converting, storing, transforming, and copying may use a specified bank order. In addition, the method may comprise receiving an update package comprising at least one of a preprocessing instruction, an update instruction, and a bank order specification, where the receiving may use a public network, and the receiving may use a wireless network.

Yet other aspects of the present invention may be observed in a method of updating an electronic device from a first code version to a second code version, the electronic device having a non-volatile memory comprising a plurality of banks containing the first code version, the method comprising converting the first code version to the second code version in a fault tolerant manner, wherein the method requires only two writes to each bank being updated.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to the updating of firmware/software components in electronic devices such as mobile handsets and personal digital assistants. More specifically, aspects of the present invention relate to a fault tolerant method of updating memory involving preprocessing the memory prior to performing an update in order to reduce the amount of data copied, the time needed to perform the update, and to extend the life of the updated memory.

Figure 1:
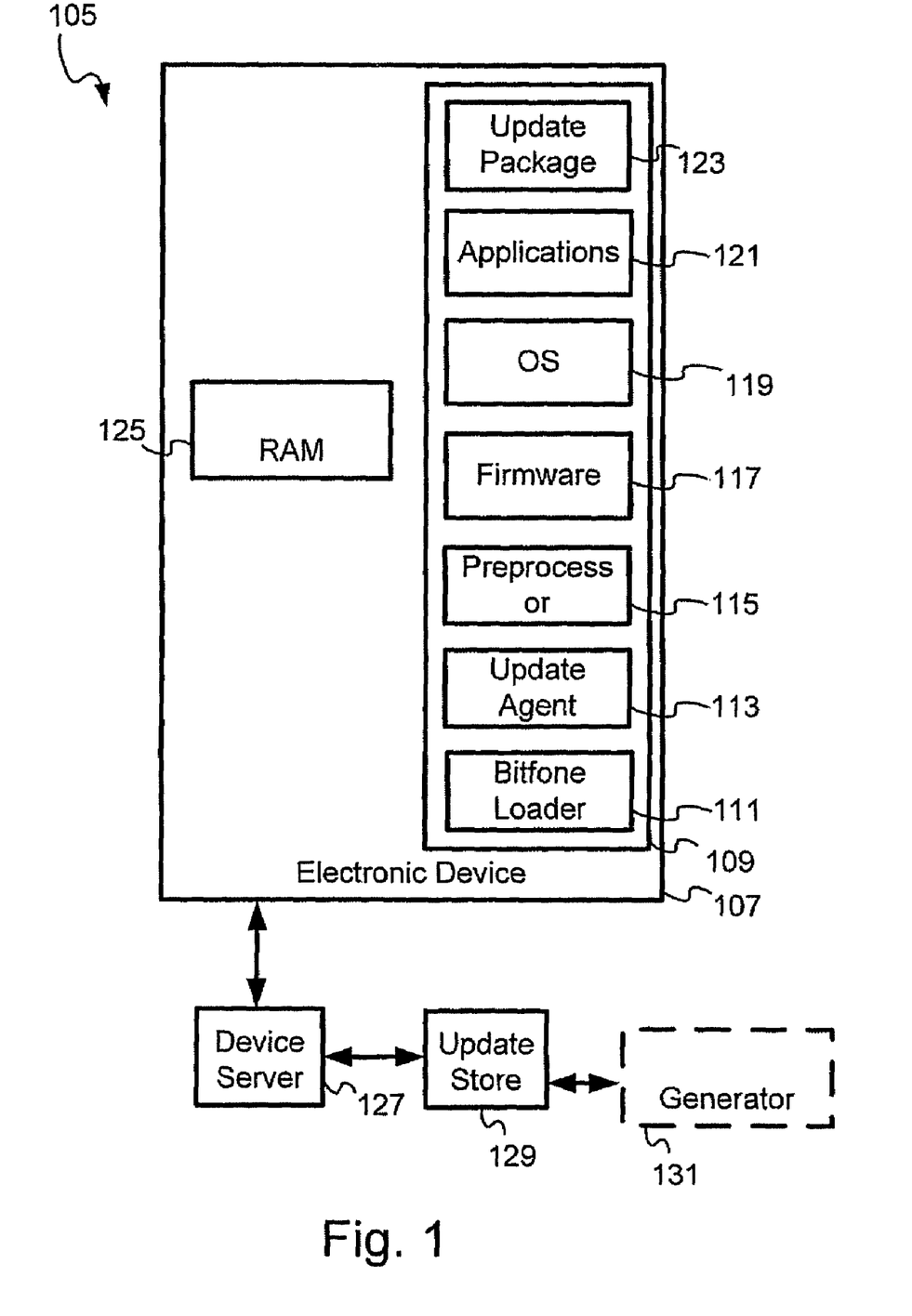
FIG. 1 is a block diagram of an exemplary update network for dispensing an update package to an electronic device, the electronic device employing an update agent to update its operating system, applications software, and/or firmware, in accordance with the present invention.

FIG. 1 is a block diagram of an exemplary update network 105 for dispensing an update package 123 to an electronic device 107, the electronic device 107 employing an update agent 113 to update its operating system 119, applications software 121, and/or firmware 117, in accordance with the present invention. The update package 123 is produced by a generator 131 and processed by the update agent 113, to update the firmware and software of electronic device 107 in a fault-tolerant mode employing bank-by-bank update techniques.

The network 105 comprises an electronic device 107, a device server 127, an update store 129, and a generator 131. The electronic device 107 is communicatively coupled to the device server 127, which is communicatively coupled to the update store 129. The communication link between the electronic device 107 and the device server 127 may be, for example, a wired network, a wireless network, a public network, an Internet-based network, and an intranet-based network, or any combination of the above. The update store 129 has stored within it a collection of update packages produced by the generator 131. The update packages stored within update store 129 are communicated to device server 127 for distribution to and processing by the electronic device 107. In one embodiment of the present invention, the device server 127, the update store 129, and the generator 131 may be co-located on a single computer or grouped in any combination on a networked cluster of computers.

The electronic device 107 comprises a volatile random access memory (RAM) 125 and a non-volatile memory 109. The volatile memory 125 may be used for the execution of programs and for the temporary storage of program variables. The non-volatile memory 109 is comprised of a plurality of banks or blocks and may be used for the storage of programs, update packages, and for other non-volatile storage. The non-volatile memory 109 comprises a loader 111, an update agent 113, a preprocessor 115, a firmware 117, an operating system (OS) 119, one or more applications 121, and at least one update package 123. In a particular embodiment of the present invention the preprocessor 115 may also be a part of the update agent 113.

In one embodiment of the present invention, the generator 131 may process a first version and a second version of the firmware of the electronic device 107 in order to produce a set of preprocessing instructions, and difference information comprising a set of update instructions. The preprocessing instructions and the update instructions may be assembled into an update package. The update packages generated by the generator 131 may be stored in the update store 129 for subsequent retrieval by the electronic device 107, via the device server 127. Once retrieved from the update store 129, an update package may be used by electronic device 107 to convert or transform portions of its firmware/software from the first version to the second version in a bank-by-bank fashion.

The update agent 113 in an embodiment of the present invention may employ the preprocessor 115 as a part of the processing of the update package 123. In such an embodiment, the preprocessor may shift selected banks of non-volatile memory 109 by a distance equal to, for example, the size of one or more banks, according to a bank order. In this discussion, the terms "bank" or "block" may be used to represent a portion of non-volatile memory 109. The shifting of selected banks of the non-volatile memory 109 allows an embodiment of the present invention to eliminate the need to "back up" the bank being updated during a subsequent fault tolerant update process. An example fault tolerant update process is described in U.S. Provisional Patent Application Ser. No. 60/434,712 (attorney docket number 14323U.S.02), entitled "Mobile Handset With A Fault Tolerant Update Agent", filed Dec. 18, 2002, the complete subject matter of which is hereby incorporate by reference herein, in its entirety.

For example, prior to performing a fault tolerant update, the preprocessor 115 may move the firmware 117 and/or software 119, 121 portions of the non-volatile memory 109 by the size of at least one bank, initially creating an unoccupied first bank or "first bank bubble". This may be done as a part of other preprocessing operations such as, for example, a "bubbles" preprocessing technique, a "nodes" preprocessing technique, or a "shift regions" preprocessing technique, and may be performed according to a bank order specification contained within an update package. An example of a suitable "bubbles" preprocessing technique may be found in U.S. Provisional Patent Application Ser. No. 60/405,253, entitled "Firmware Update Network And Process Employing Preprocessing Techniques", filed on Aug. 22, 2002. An example of another "bubbles"-type preprocessing technique may be found in U.S. Provisional Patent Application Ser. No. 60/415,620, entitled "System For Generating Efficient And Compact Update Packages", filed on Oct. 2, 2002. An example of a "nodes" preprocessing technique may be found in U.S. Provisional Patent Application Ser. No. 60/441,867, entitled "Mobile Handset Update Package Generator That Employs Nodes Technique", filed on Jan. 22, 2003. Finally, a suitable "shift regions" preprocessing technique is described in U.S. Provisional Patent Application Ser. No. 60/447,977, entitled "Update Package Generator Employing Partial Predictive Mapping Techniques For Generating Update Packages For Mobile Handsets", filed on Feb. 18, 2003. The complete subject matter of each of the Patent Applications listed above is hereby incorporated herein, in its entirety. The unoccupied bank or "bubble" may then be used by the update agent 113 as a moving bubble or destination bank into which the updated firmware/software banks are written, after each of them have been updated in the RAM 125. An embodiment of the present invention may combine the shifting of a set of banks of firmware with other preprocessing activities such as, for example, the updating of addresses, references, link instructions, etc. that may be performed during the preprocessing methods of the above references. The "first bank bubble" technique described herein may be used whether or not other preprocessing techniques are employed.

Figure 2:
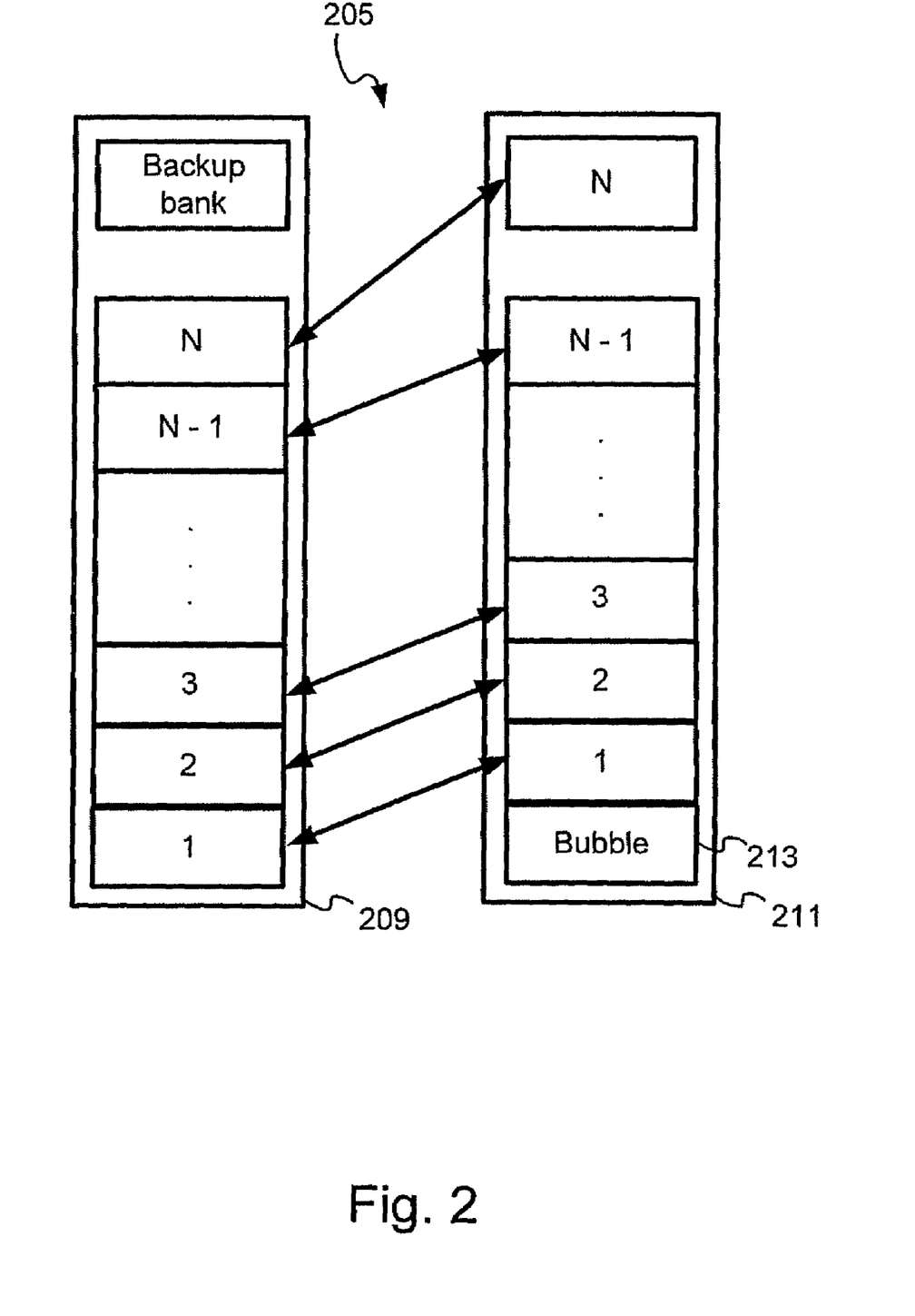
FIG. 2 is a block diagram depicting the operation of an exemplary "first bank bubble"-based preprocessing technique that may be employed by an update agent in an electronic device such as the electronic device illustrated in FIG. 1, in accordance with the present invention.

FIG. 2 is a block diagram depicting the operation of an exemplary preprocessing technique that may be employed by an update agent in an electronic device such as the electronic device 107 illustrated in FIG. 1, in accordance with the present invention. The illustration of FIG. 2 shows a non-volatile memory 209 having banks 1 to N, prior to the application of the "first bank bubble" preprocessing technique, and a non-volatile memory 211 having banks 1 to N and bubble 213 corresponding to the non-volatile memory 209, following the application of the "first bank bubble" preprocessing technique. In the exemplary embodiment illustrated in FIG. 2, a bank order specification is not used. A preprocessor such as the preprocessor 115 of FIG. 1 may shift selected banks of the firmware contained in non-volatile memory 209 by the size of one or more banks. This shift of the contents of the non-volatile memory 209 creates an empty bank or "bubble", illustrated in FIG. 2 as bubble 213 in the non-volatile memory 211. The shifting of the banks of non-volatile memory 209 may be performed by an update agent, such as the update agent 113 of FIG. 1, as a part of performing other preprocessing operations described above. The illustration of FIG. 2 shows a situation where all N banks of the non-volatile memory 209 are modified in a sequential fashion beginning with bank 1. An embodiment of the present invention may also be applied to updates of memory, such as non-volatile memory 209, where not all banks within the memory are being updated, and where the order of the bank update is not a sequential order.

As described above, an explicit bank order specification may not be included in the update package. In such an embodiment, the update agent may first move one or more banks of non-volatile memory 209 in a sequential fashion, as shown in FIG. 2. The movement of these banks may be combined with other preprocessing operations and may begin by moving the contents of bank N to a designated or reserved area of non-volatile memory 209. Bank N–1 may then be moved to bank N, bank N–2 moved to bank N–1 and so on until bank 1 is moved to bank 2. In this manner, an empty/unoccupied bank or "bubble" is created at bank 1.

Following the shifting of the banks to be updated, the update agent may begin updating the non-volatile memory starting with bank 1. The update agent may copy the contents of bank 2 to a designated "working bank" in volatile memory, such as the RAM 125 of FIG. 1. The update agent may then use update instructions for bank 1 that are contained in the update package to update the contents of the working bank. Upon updating the working bank, the update agent may store the contents of the working bank into the currently unoccupied bank 1. The update agent may use a cyclic redundancy check (CRC), MD5 checksum, or other calculated value to verify the success of the update. The update agent may then update the now unoccupied bank 2, using the original contents of bank 2 that was stored in bank 3, and continue in like manner until bank N–1 is updated. Finally, bank N may be updated using the original bank N contents that was stored in the designated reserved or backup location. In this manner, an embodiment of the present invention may combine the shifting of a set of banks of firmware with other preprocessing activities as described above, reducing the number of writes to each updated memory location from four writes per updated memory location to two writes per updated memory location, while also providing complete fault tolerance. This minimizes the number of writes to non-volatile memory, reducing the time needed to update the memory, and extending the life of the non-volatile memory devices that are typically used in such applications.

Figure 3:
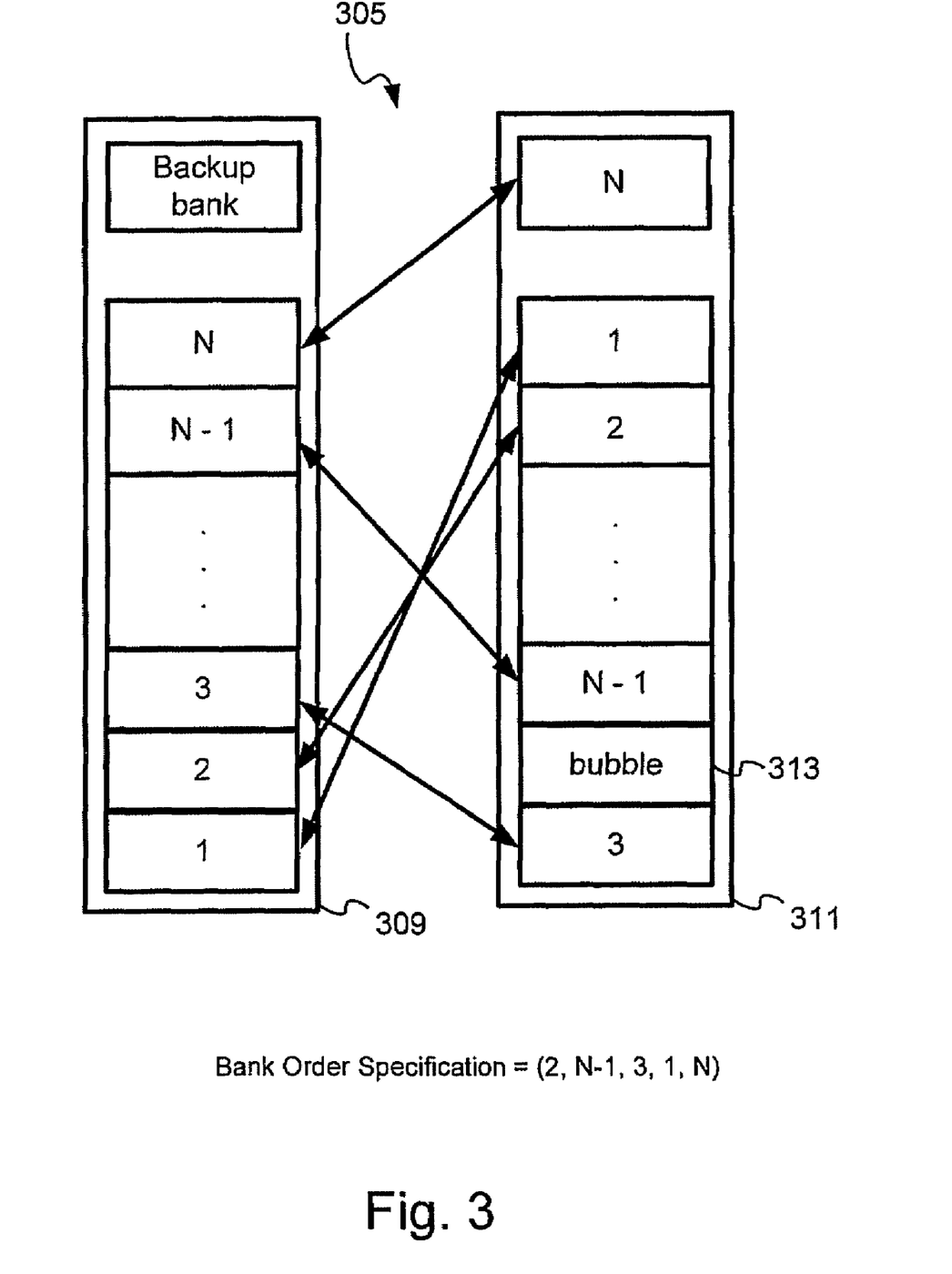
FIG. 3 is a block diagram depicting the operation of another exemplary "first bank bubble"-based preprocessing technique that may be employed by an update agent in an electronic device such as the electronic device illustrated in FIG. 1, in accordance with the present invention.

FIG. 3 is a block diagram depicting the operation of another exemplary "first bank bubble"-based preprocessing technique that may be employed by an update agent in an electronic device such as the electronic device 107 illustrated in FIG. 1, in accordance with the present invention. The illustration of FIG. 3 shows a first, original arrangement of a non-volatile memory 309, and a second, preprocessed arrangement of the non-volatile memory 311. In the example illustrated in FIG. 3, the update package received by the electronic device 107 of FIG. 1 includes a bank order specification (a.k.a., "bank order"). The bank order may be defined by a generator such as generator 131 of FIG. 1 at the time the update package is created. The use of a bank order specification in the update process may permit a generator, such as the generator 131 of FIG. 1, to produce a more compact and efficient update package. A preprocessor, such as the preprocessor 115 of FIG. 1, may use the bank order contained in an update package to move one or more banks of a non-volatile memory such as non-volatile memory 309 prior to performing the update of the affected banks. In an embodiment of the present invention, a preprocessor such as the preprocessor 115 of FIG. 1 may also be contained within an update agent, such as the update agent 113 of FIG. 1. As described above, the shifting operations used by an embodiment of the present invention may be in addition to and combined with other operations indicated in the update package.

Using the bank order specification, the preprocessor may first move the contents of the last bank in the bank order to a designated reserved or backup bank in the arrangement of non-volatile memory 311. The preprocessor may then move the bank in position N–1 in the bank order to the location of the bank in position N in the bank order, then move the bank in position N–2 in the bank order to the location of the bank in position N–1 in the bank order, and so on. This sequence of moves continues until the bank that is first in the bank order is moved to the memory location of the bank that is second in the bank order. In this manner, an empty or unoccupied bank or "bubble" is created that corresponds to the first bank in the bank order.

For example, let us assume that a bank order specification is contained in the update package to be used in updating the non-volatile memory 309 of FIG. 3. Let us further assume that the bank order specification is as shown in FIG. 3, (2, N–1 3, 1, N), indicating that the banks of non-volatile memory 309 are to be updated in the order bank 2, bank N–1 bank 3, bank 1, and bank N. In an embodiment of the present invention, a preprocessor, such as the preprocessor 115 of FIG. 1, may use the bank order specification to move the affected banks of non-volatile memory 309 in the reverse of the bank order specification. As shown in the arrangement of non-volatile memory 311 of FIG. 3, the last bank in the bank order specification, bank N of the arrangement of non-volatile memory 309, is moved to a reserved or "backup" bank in the preprocessed arrangement of the non-volatile memory 311. Then, the next-to-last bank in the bank order specification, bank 1 of the arrangement of non-volatile memory 309, is moved to the vacant bank created when bank N was moved to the backup bank in the arrangement of non-volatile memory 311. Next bank 3 in the arrangement of non-volatile memory 309 is moved to the vacant bank created when bank 1 was move to bank N of the arrangement of nonvolatile memory 311. This sequence of bank-to-bank moves continues until the first bank in the bank order specification, in this case bank 2, is moved to reside in the original location of the second bank in the bank order, in this case bank N–1 The result is a vacant/unoccupied bank or "bubble" 313 at the original location of the first bank in the bank order, bank 2.

Following the shifting of the banks to be updated, an update agent, such as the update agent 113 of FIG. 1, updates the preprocessed non-volatile memory 311 starting with the first bank in the bank order. The update agent may first copy the contents of the second bank in the bank order, bank N–1 that contains the contents of the first bank in the bank order, bank 2, to a designated "working bank" in volatile memory, such as the RAM 125 of FIG. 1. The update agent 113 may then use the update instructions contained in the update package that apply to the first bank in the bank order, in this case bank 2, to update the contents of the working bank. In one embodiment, the update may be performed by converting or transforming the contents of the working bank using update instructions contained in an update package. Upon updating the working bank, the update agent may copy the contents of the working bank into the first (currently unoccupied) bank in the bank order, bank 2. The update agent may calculate a cyclic redundancy check (CRC), MD5 checksum, or other value to verify the success of each of the steps of the update. The update agent may then update the now unoccupied second bank in the bank order in the same manner, using the original contents of the second bank that is stored in the third bank in the bank order. The update continues in like manner until the next-to-last bank in the bank order is updated. Finally, the last bank in the bank order is updated, in this example bank N, using the original bank N contents stored in the designated reserved or backup location. In this manner, an embodiment of the present invention reduces the amount of copying of the contents of the memory being updated, reducing the time needed to update the memory, and extending the life of the memory devices that are typically used in such applications.

As discussed above, the preprocessing activities defined by the generator 131 of FIG. 1 and described in the update package received by the electronic device 107 of FIG. 1 may be combined with the shifting operations described above with respect to FIGS. 2 and 3. In the process described above, banks of a non-volatile memory 309 are moved by preprocessing activities to create an empty or unoccupied bank, shown as bubble 313 in the arrangement of non-volatile memory 311. In the discussion above and the associated illustrations of FIGS. 2 and 3, this shifting creates an unoccupied bank or "bubble" equal to the size of one bank. In another embodiment, however, the shifting of firmware/software code using other bubble sizes, such as the size of multiple banks, is also possible.

Aspects of the present invention provide a network having a plurality of electronic devices and that employs a generator to produce update packages for the electronic devices. A corresponding update agent in the electronic devices uses the update packages to update its firmware and/or software. The generator specifies preprocessing steps that incorporate shifting of firmware and/or software code by one or more memory banks so as to create a "first bank bubble" in the non-volatile memory of the electronic device during a preprocessing activity. A preprocessor or update agent in the electronic device subsequently employs the "first bank bubble" as a moving bubble or vacant bank to conduct an efficient and fault tolerant update.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating an electronic device from a first code version to a second code version according to a bank order having a penultimate bank, the electronic device having a non-volatile memory comprising a reserved area and a plurality of banks containing the first code version, the method comprising:
   moving the contents of the last bank in the bank order to the reserved area of the non-volatile memory;
   shifting the contents of each bank in the bank order to the next bank in the bank order beginning with the penultimate bank in the bank order, and proceeding in descending bank order until the contents of the first bank in the bank order has been shifted to the second bank in the bank order;
   converting the contents of each bank in the bank order from the first code version to the second code version in a fault tolerant manner beginning with the second bank in the bank order and proceeding in ascending bank order until the last bank in the bank order has been converted, each converted bank being stored in the previous bank in the bank order; and
   transforming the contents of the reserved area from the first code version to the second code version in a fault tolerant manner, the second code version being stored in the bank that is last in the bank order.

2. The method of claim 1 wherein at least one of the moving and the shifting is performed coincident with at least one preprocessing technique.

3. The method of claim 2 wherein the at least one preprocessing technique uses at least one preprocessing instruction.

4. The method of claim 2 wherein the at least one preprocessing technique comprises at least one of a bubbles technique, a nodes technique, and a shift region technique.

5. The method of claim 1 wherein the updating uses only two writes to each non-volatile memory location being updated.

6. The method of claim 1 further comprising:
   receiving an update package comprising at least one of at least a preprocessing instruction, an update instruction, and a bank order specification.

7. The method of claim 6 wherein the receiving uses a public network.

8. The method of claim 6 wherein the receiving uses a wireless network.

9. The method of claim 1 wherein at least one of the converting and the transforming uses at least one update instruction.

10. The method of claim 1 wherein at least one of the moving and shifting uses an offset of more than one bank.

11. A method of updating an electronic device, the electronic device having a non-volatile memory comprising a reserved area and a plurality of banks containing a first code version, the method comprising:
   moving the contents of a designated bank to the reserved area of the non-volatile memory, the designated bank thereby becoming an unoccupied bank;
   shifting the contents of each of the plurality of banks other than the designated bank from an original bank to an unoccupied bank in a bank by bank fashion, each original bank thereby temporarily becoming an unoccupied bank;
   converting the contents of each of the plurality of banks other than the designated bank from the first code version to a second code version in a fault tolerant manner beginning with the contents of the last bank shifted and proceeding in reverse order of the shifting, the second code version of each bank being stored into the original bank from which the first code version of the bank was shifted; and
   transforming the contents of the reserved area of the non-volatile memory from the first code version to a second code version in a fault tolerant manner, the second code version being stored in the designated bank.

12. The method of claim 11 wherein at least one of the moving, shifting, converting, and transforming is performed according to a specified bank order.

13. The method of claim 11 wherein at least one of the moving and shifting further comprises preprocessing the contents of at least one of the plurality of banks.

14. The method of claim 13 wherein the preprocessing comprises at least one of rearranging the contents of a bank, updating an address, updating a reference, and updating a branch instruction.

15. The method of claim 13 wherein the preprocessing uses at least one of a bubbles technique, a nodes technique, and a shift regions technique.

16. The method of claim 13 wherein the preprocessing uses at least one preprocessing instruction.

17. The method of claim 11 wherein at least one of the converting and transforming uses at least one update instruction.

18. The method of claim 11 further comprising:
   receiving an update package comprising at least one of a preprocessing instruction, an update instruction, and a bank order specification.

19. The method of claim 18 wherein the receiving uses a public network.

20. The method of claim 18 wherein the receiving uses a wireless network.

21. A method of updating an electronic device having a non-volatile memory comprising at least a first bank and a second bank, the at least a first bank and a second bank containing a first code version, the method comprising:
- moving the contents of the second bank to a reserve bank;
- transferring the contents of the first bank to the second bank;
- converting the contents of the second bank to an updated version of the first bank;
- storing the converted contents of the second bank into the first bank;
- transforming the contents of the reserve bank into an updated version of the second bank; and
- copying the transformed contents of the reserve bank to the second bank.

22. The method of claim 21 wherein at least one of the converting and the transforming uses at least one update instruction.

23. The method of claim 21 wherein at least one of the moving and the transferring comprises preprocessing the contents of at least one of the plurality of banks.

24. The method of claim 23 wherein the preprocessing comprises at least one of rearranging the contents of a bank, updating an address, updating a reference, and updating a branch instruction.

25. The method of claim 23 wherein the preprocessing uses at least one of a bubbles technique, a nodes technique, and a shift regions technique.

26. The method of claim 23 wherein the preprocessing uses at least one preprocessing instruction.

27. The method of claim 21 wherein at least one of the moving, transferring, converting, storing, transforming, and copying uses a specified bank order.

28. The method of claim 21 further comprising:
- receiving an update package comprising at least one of a preprocessing instruction, an update instruction, and a bank order specification.

29. The method of claim 28 wherein the receiving uses a public network.

30. The method of claim 28 wherein the receiving uses a wireless network.

31. A method of updating an electronic device from a first code version to a second code version, the electronic device having a non-volatile memory comprising a plurality of banks containing the first code version, the method comprising:
- in a fault tolerant manner,
- first writing contents of a first bank of the plurality of banks to a second bank of the plurality of banks, according to a bank order;
- second writing converted contents of the second bank to the first bank, in reverse bank order; and
- wherein only two writes to each bank in the bank order occur.

* * * * *